(12) United States Patent
Koch

(10) Patent No.: US 9,562,469 B2
(45) Date of Patent: Feb. 7, 2017

(54) EXHAUST GAS TURBOCHARGER

(75) Inventor: Silvio Koch, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 464 days.

(21) Appl. No.: 14/123,997

(22) PCT Filed: Jun. 20, 2012

(86) PCT No.: PCT/US2012/043216
§ 371 (c)(1),
(2), (4) Date: Dec. 5, 2013

(87) PCT Pub. No.: WO2013/003134
PCT Pub. Date: Jan. 3, 2013

(65) Prior Publication Data
US 2014/0119896 A1 May 1, 2014

(30) Foreign Application Priority Data
Jun. 28, 2011 (DE) .......................... 10 2011 105 856

(51) Int. Cl.
| F02B 37/18 | (2006.01) |
| F02B 37/22 | (2006.01) |
| F01D 17/10 | (2006.01) |
| F01D 17/20 | (2006.01) |
| F02C 6/12 | (2006.01) |

(52) U.S. Cl.
CPC ............. *F02B 37/22* (2013.01); *F01D 17/105* (2013.01); *F01D 17/20* (2013.01); *F02B 37/183* (2013.01); *F02B 37/186* (2013.01); *F02C 6/12* (2013.01); *Y02T 10/144* (2013.01)

(58) Field of Classification Search
CPC ....... F02B 37/22; F02B 37/183; F02B 37/186; F02B 37/00; F02B 37/18; F02C 6/12; F01D 17/105; F01D 17/20; F01D 17/00
See application file for complete search history.

(56) References Cited

U.S. PATENT DOCUMENTS

| 2011/0023481 A1* | 2/2011 | Baeuerle | F01D 17/105 60/602 |
| 2011/0110767 A1* | 5/2011 | Castan | F01D 17/165 415/159 |

* cited by examiner

Primary Examiner — Gregory Anderson
Assistant Examiner — Michael Sehn
(74) Attorney, Agent, or Firm — A. Michael Tucker; Stephan A. Pendorf; Patent Central LLC

(57) ABSTRACT

An exhaust gas turbocharger (1) having a compressor (2), a turbine (3) which has a turbine casing (4) in which a wastegate opening (5) is arranged and which has a charge pressure control flap arrangement (6) with a flap plate (7) which can be moved between a closed position and an open position. The flap plate (7) is provided with a guide lever (8) whose first end (9) is connected to a rear side (10) of the flap plate (7) and whose second free end (11) is guided in a curved track (12).

8 Claims, 10 Drawing Sheets

EXHAUST GAS TURBOCHARGER

The invention relates to an exhaust gas turbocharger according to the preamble of claim 1.

Such an exhaust gas turbocharger is known from DE 10 2008 011 416 A1. This exhaust gas turbocharger has a charge pressure control flap arrangement, wherein in such arrangements there is a conflict of aims between the required diameter for the flap bore, the resulting forces/torques, the possible adjustment of an actuator of the control flap arrangement, and the flow resistance of the system.

In particular in systems such as are known from the above-mentioned DE 10 2008 011 416 A1, which reduce the necessary actuator forces by means of what is referred to as a resolution of forces, there is considerably enlarged relative movement between the flap plate and the flap seat.

Together with degrees of play, tolerances and thermal expansions, this can lead to the flap plate becoming jammed in the flap bore, to increased wear or even to failure.

The aim of the present invention is therefore to provide an exhaust gas turbocharger of the type indicated in the preamble of claim 1, which reduces the previously explained disadvantages or entirely eliminates them.

The means of achieving this aim are provided by the features of claim 1.

As a result it is ensured that despite a reduction in the effective lever arm at the flap lever, a drastic reduction in the required force expenditure at the actuator is obtained, wherein at the same time the disadvantages of the prior art of the generic type are overcome since the flap plate is provided with a guide lever or additional joint which is guided in a curved track or cam track. This curved track or cam track (and therefore the flap arrangement) can either be integrated in a turbine casing of an exhaust gas turbocharger or in an exhaust manifold. In addition it is possible for the curved track to be arranged in a separate insert which can be connected to the turbine casing or the exhaust manifold.

In the case of the separate insert, the flap seat (sealing face) can be integrated into the turbine casing or the exhaust manifold or can be part of the separate insert. The separate insert may, for example, be screwed into the turbine casing or the exhaust manifold.

This results in the following advantages:

The flap plate moves parallel to the flap seat over large distances and therefore cannot become jammed and therefore cannot damage the flap seat either.

By means of a special guiding geometry it is possible for the flap plate to be pivoted completely out of the flow of the exhaust gas. This considerably reduces the flow losses.

At the same time, only a short actuator path is required owing to the guiding geometry.

In addition, an improved controllability is brought about, and in the fully opened state the flap plate can bear against the lever of the control flap arrangement, providing the advantage that there is no longer any solid-borne sound, and therefore no noise, anymore.

The dependent claims contain advantageous developments of the invention.

Further details, features and advantages of the invention can be found in the following description of exemplary embodiments with reference to the drawing, in which.

A preferred embodiment of an exhaust gas turbocharger 1 with a charge pressure control flap arrangement 6 according to the invention will be described below.

Figure 1:
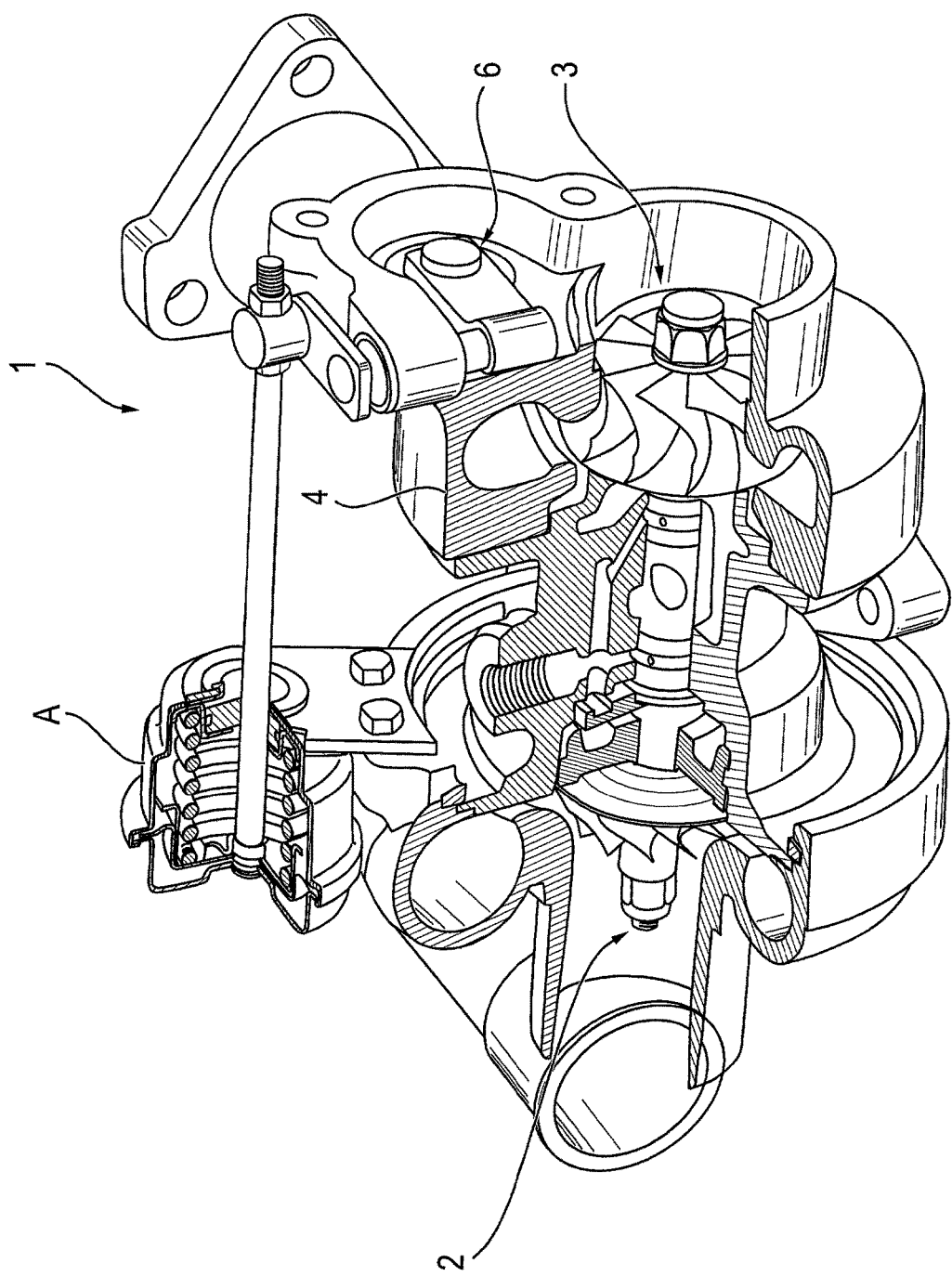
FIG. 1 shows a sectional perspective illustration of an exhaust gas turbocharger in which the charge pressure control flap arrangement according to the invention can be used.

The turbocharger 1 illustrated in FIG. 1 has a compressor 2, a turbine 3, having a turbine casing 4, and a charge pressure control flap arrangement 6 which can be activated by an actuator A.

Figure 2:
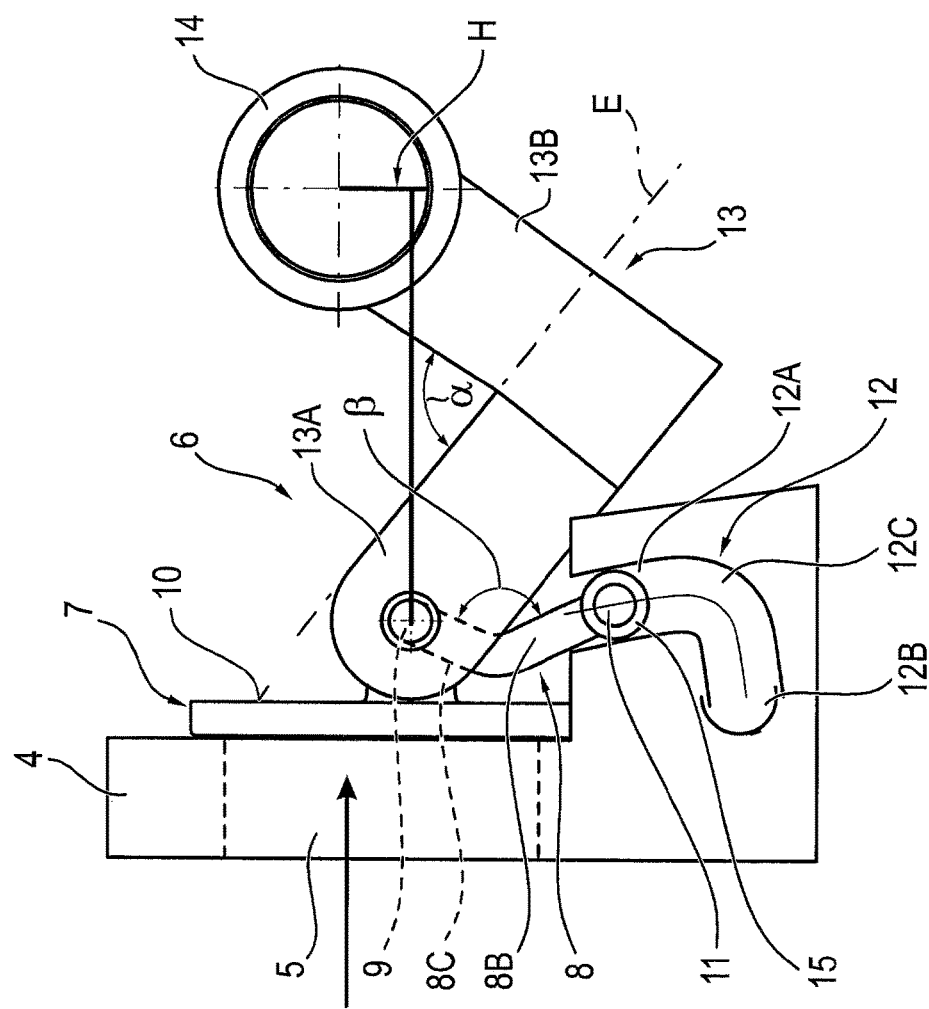
FIG. 2 shows a schematic, slightly simplified sectional illustration of the control flap arrangement according to the invention.

The charge pressure control flap arrangement 6 has, as is apparent from FIG. 2, a flap plate 7 which can be moved between a closed position and an open position of a wastegate opening 5, FIG. 2 illustrating the closed position. The flap plate 7 is provided with a guide lever 8 whose first end 9 is connected to a rear side 10 of the flap plate 7. A second end 11 of the guide lever 8 is provided with a sliding bushing 15 or can be provided with a roller body and is guided in a curved track 12 which is formed in the turbine casing or in the exhaust manifold.

Figure 3:
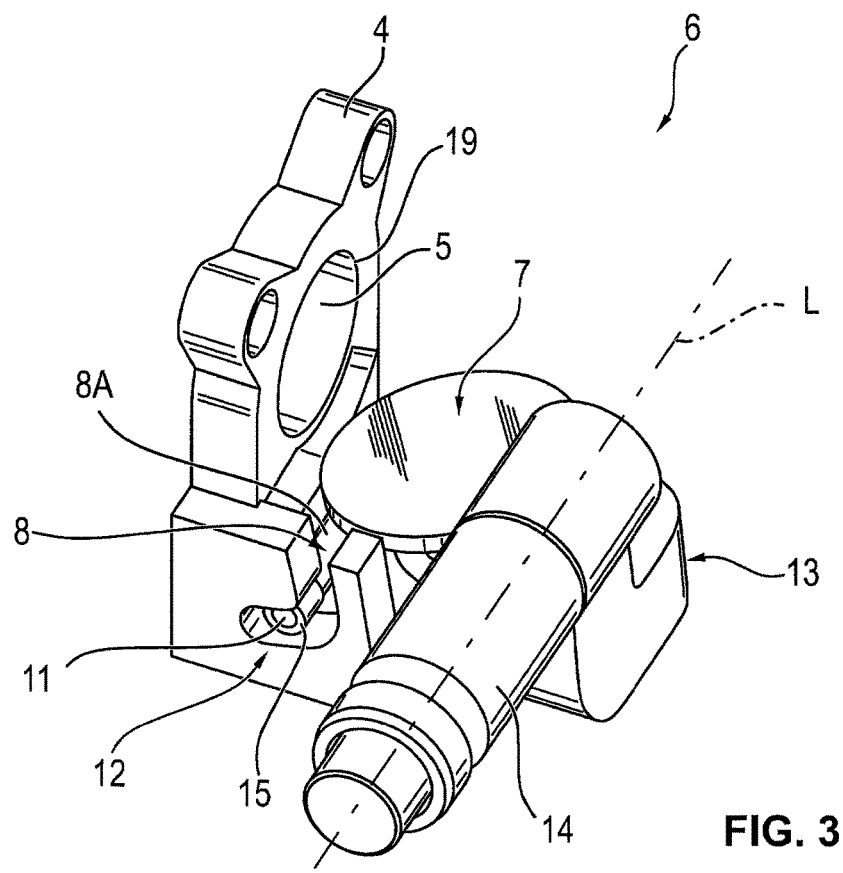
FIG. 3 shows a perspective, schematically slightly simplified illustration of the control flap arrangement according to FIG. 2.

As is apparent from a combination of FIGS. 2 and 3, the guide lever 8 has a lever section 8A which extends from its free end 11 linearly at least approximately parallel to a longitudinal axis L of an activation shaft 14. The lever section 8A of the guide lever 8 is joined by a lever section 8B which is arranged at an angle and extends essentially perpendicularly with respect to the latter. After this, a lever section 8C, arranged at an obtuse angle β with respect to the lever section 8B, leads to the first end 9 of the guide lever 8.

As is also apparent from FIG. 2, the first end 9 of the guide lever 8 is also connected to a pivot lever 13, which is operatively connected to the activation shaft of the actuator A of the charge pressure control flap arrangement 6. The pivot lever 13 has a first lever arm 13B, connected to the activation shaft 14, and a second lever arm 13A which is connected to the flap plate 7. The first and second lever arms 13A, 13B are preferably arranged at a right angle α with respect to one another. The pivot lever 13 is also of bent design, wherein the first lever arm 13B rises out from a plane E of the second lever arm 13A, as is illustrated in detail in the perspective illustration in FIG. 7.

Figure 4:
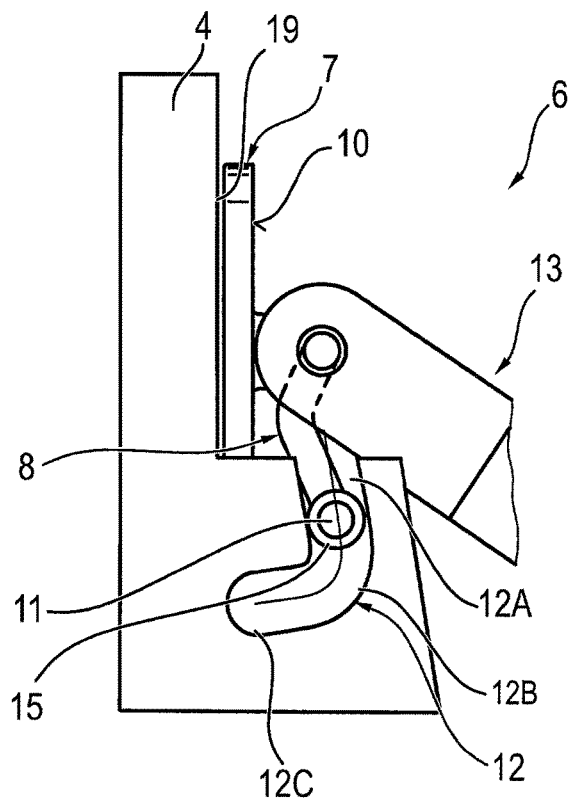
FIGS. 4-6 show illustrations of the control flap arrangement corresponding to FIG. 2 in different open states.

As is illustrated in FIG. 2, the curved track 12 has two track sections 12A and 12B which are of linear design, and a track section 12C which is arranged between these two sections and is of bent design. The shaping of the entire curved track 12 is selected here in such a way that starting the from the closed position the flap plate 7 is firstly guided in the track section 12A substantially parallel to the seat thereof on the turbine casing 4. FIG. 4 illustrates the charge pressure control flap arrangement 6 with slightly opened flap plate 7.

Figure 5:
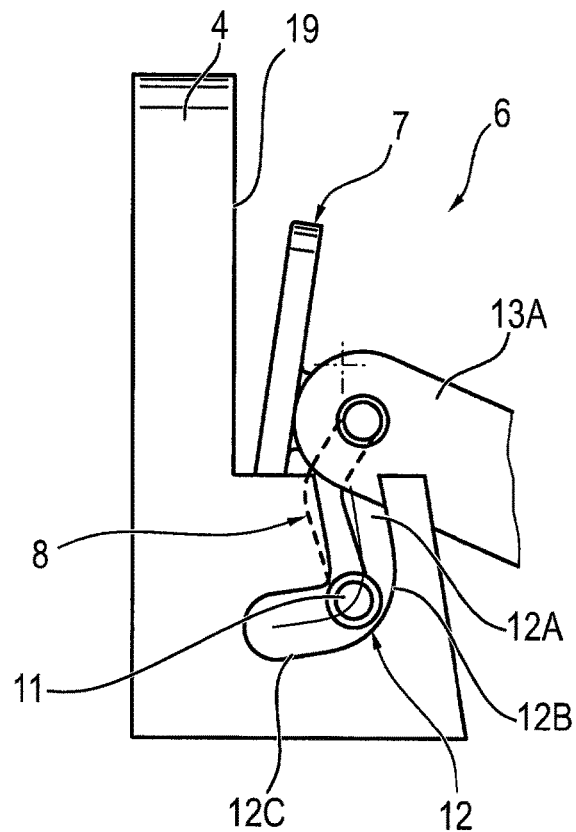
Figure 6:
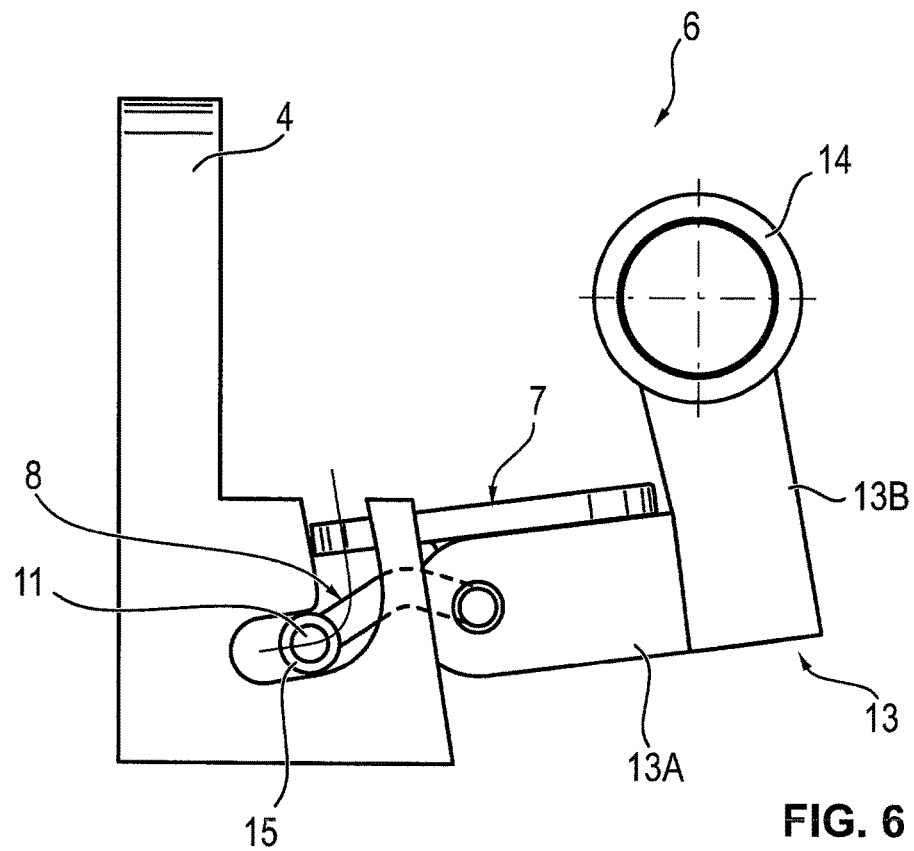

In the course of the further opening movement illustrated in FIG. 5, the flap plate 7 is pivoted away from the sealing seat by virtue of the free end 11 of the guide lever 8 which is guided in the bent curved track 12C. When the flap plate 7 is in the completely opened position, the free end 11 is, as is illustrated in FIG. 6, positioned in the linear path section 12B, and the flap plate 7 bears against the second lever arm 13A of the pivot lever 13.

Figure 7:
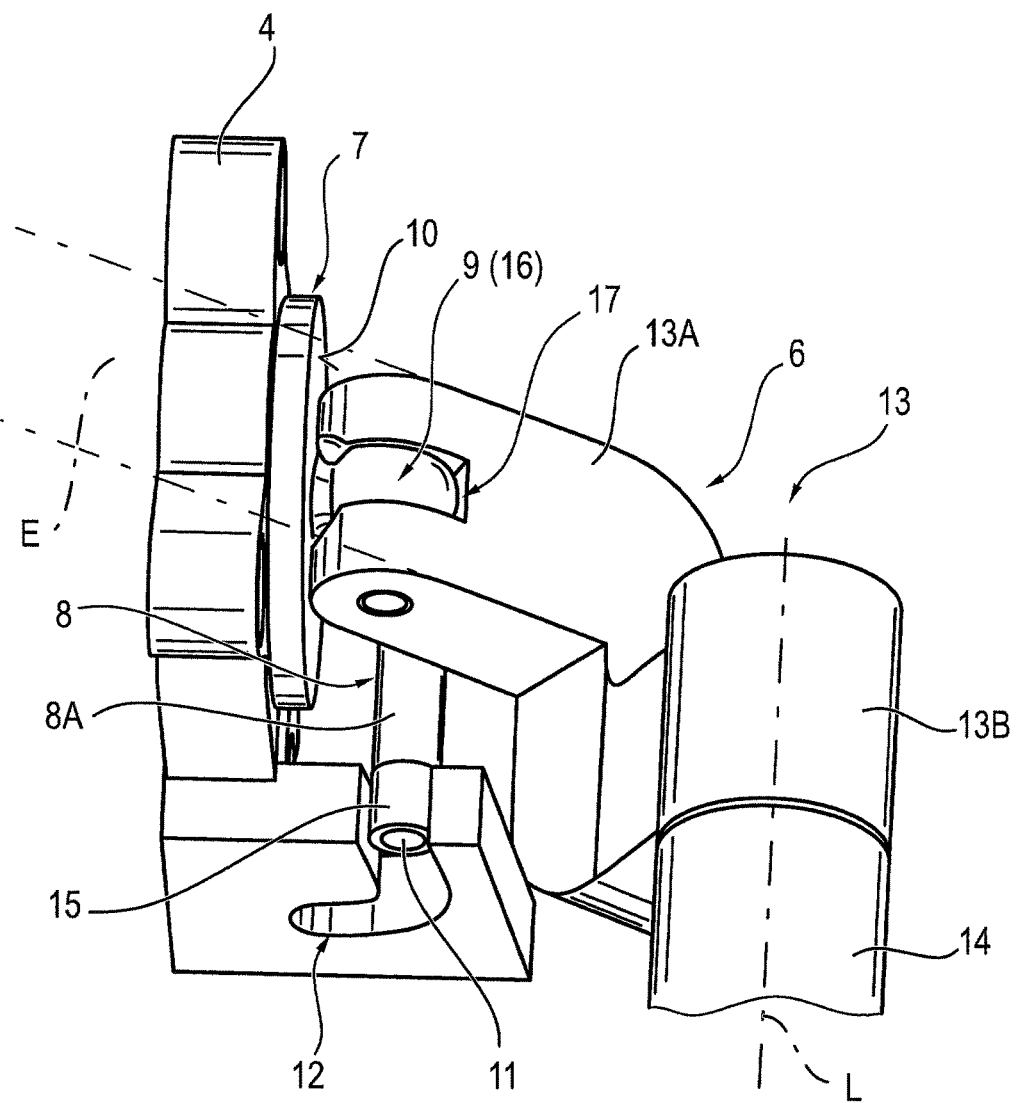
FIG. 7 shows a schematically slightly simplified perspective illustration of an alternative embodiment of the control flap arrangement.

FIG. 7 shows an alternative embodiment of the charge pressure control flap arrangement 6 in which the first end 9 of the guide lever 8 is additionally provided with a ball joint 16 which is accommodated in a fork receptacle 17 of the second lever arm 13A. This joint is a ball/cone design. However, it is also possible to use a ball/ball connection or to connect the two parts by means of a pin. This ensures operationally reliable activation of the flap plate 7 even when there are tolerance deviations or thermal deformations between the flap plate 7 and the seat thereof on the turbine casing 4.

By means of the charge pressure control flap arrangement 6 according to the invention it is possible, by virtue of the lever arm of the pivot lever which is significantly reduced, compared to the prior art, to achieve a minimized relative movement of the flap plate 7 and a considerably reduced force requirement as well as relatively small activation travel at the actuator A. In addition, the flap plate 7 can be effectively prevented from becoming jammed during operation, which contributes to significantly reduced wear and to significantly better operational reliability.

Figure 8:
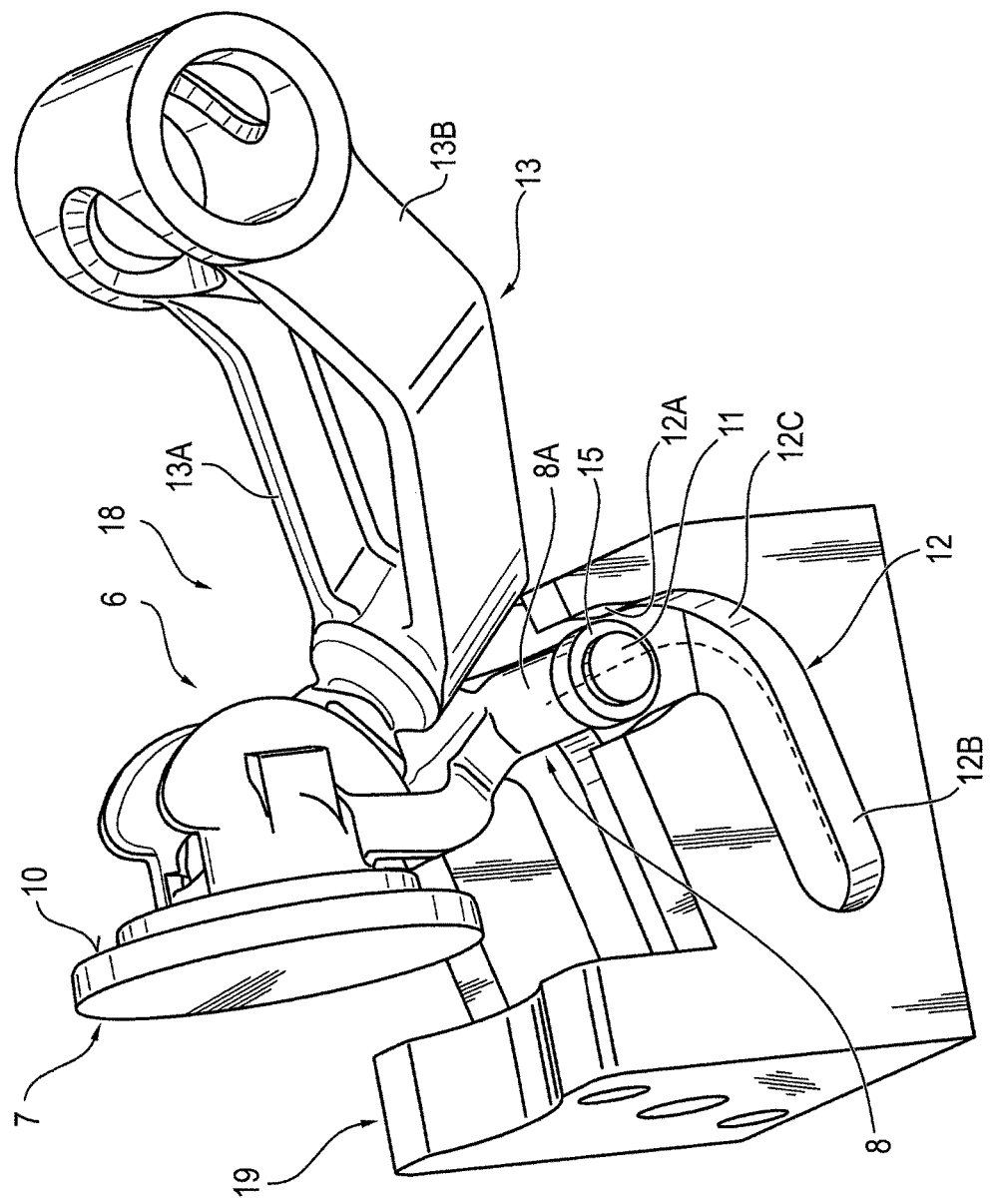
FIG. 8 shows a perspective illustration of a control flap arrangement embodied as a separate insert.

FIG. 8 illustrates a control flap arrangement which is constructed in this embodiment as a separate insert or as a separate installation part 18. This insert 18 has a base part 19 whose design and dimensions are adapted to the respective purpose of use, that is to say to a purpose of use as an attachment part to an exhaust manifold or a turbine casing of an exhaust gas turbocharger. The base part 19 has the curved track 12 on which the control flap arrangement is guided, which corresponds to the figures explained above, with the result that all the corresponding parts are provided with the same reference symbols. It is therefore possible in this respect to refer to the above description in relation to the design and the method of operation.

Figure 9:
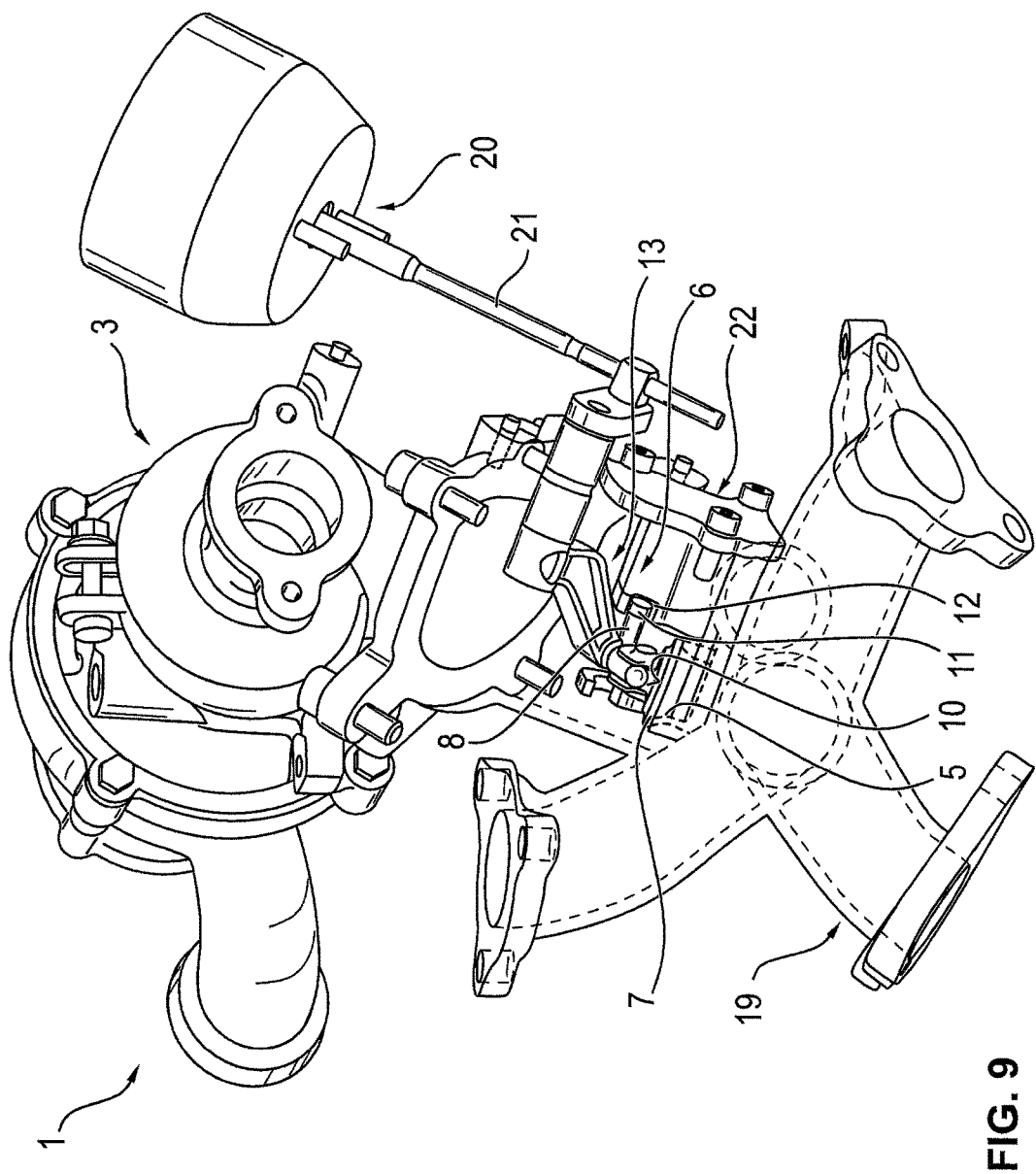
FIGS. 9-11 shows perspective sectional illustrations of a further embodiment of an exhaust gas turbocharger according to the invention.
Figure 10:
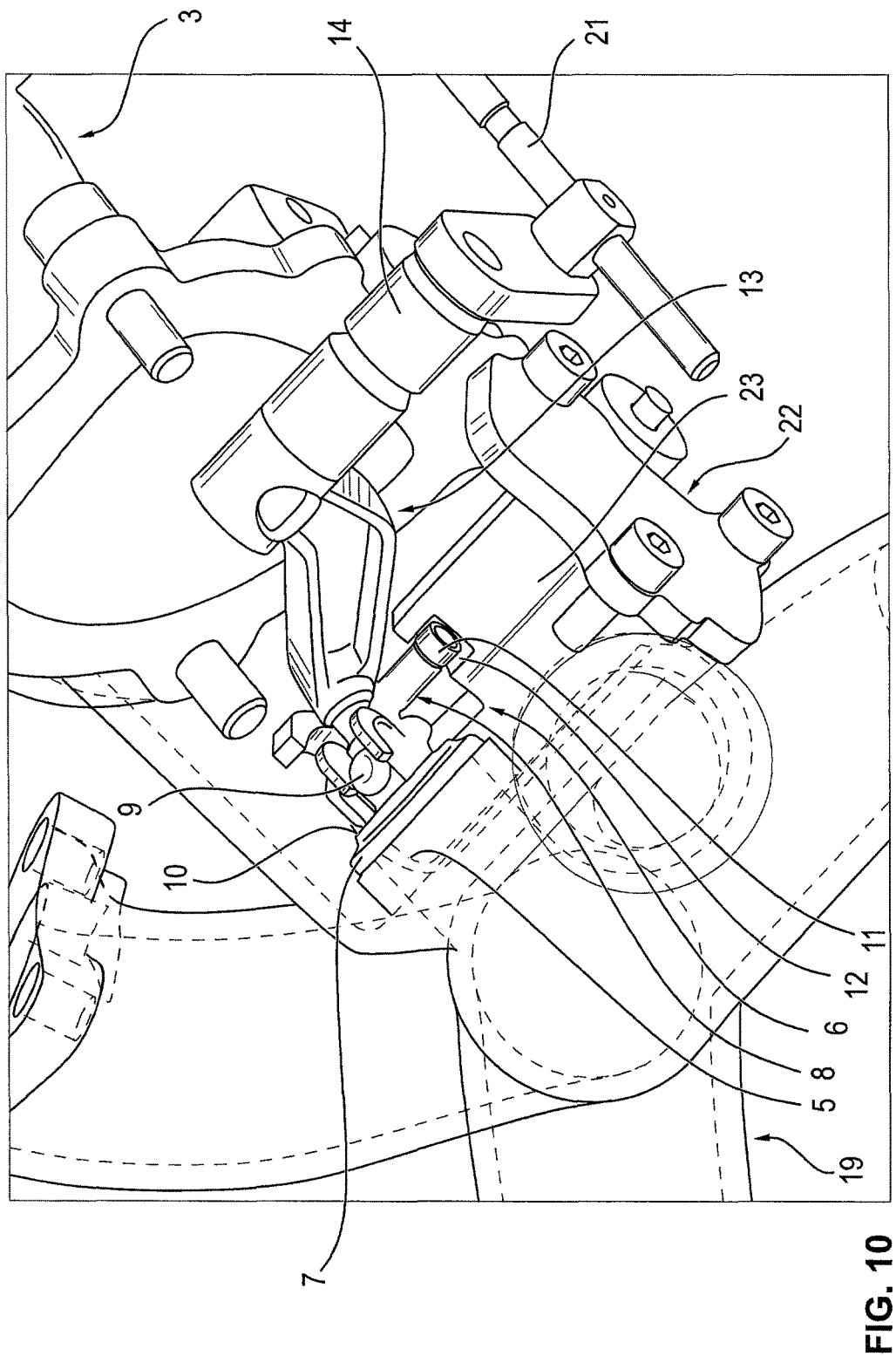
Figure 11:
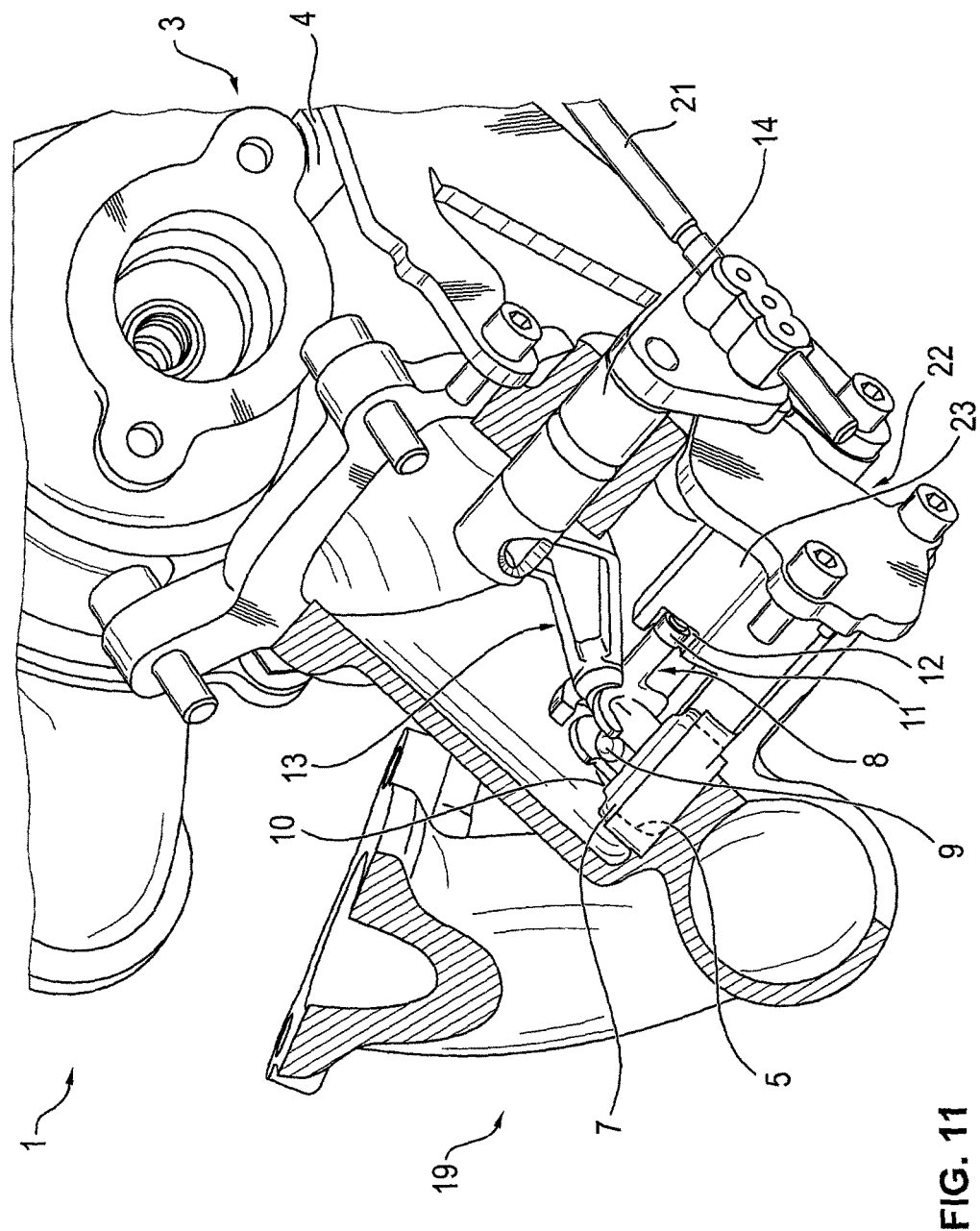

FIGS. 9 to 11 illustrate perspective sectional illustrations of a further embodiment of an exhaust gas turbocharger 1 according to the invention, in which all the parts which correspond to the embodiments above are characterized by the same reference numbers.

FIGS. 9 to 11 clarify the arrangement of the guide track 12 in an exhaust manifold 19, wherein this guide track 12 is part of a cover or installation part 22. The cover 22 has for this purpose an insert part 23 which is of plate-like design and in which the guide track 12 is arranged. This arrangement is apparent, in particular, from the illustration in FIGS. 10 and 11.

The control flap arrangement 6 is therefore arranged in a region of the exhaust manifold 19 which is connected to the turbine casing 4, and the wastegate opening 5 is part of the exhaust manifold 19.

In order to arrange the guide track 12, the installation part and/or the cover 22 is screwed to the exhaust manifold 19, wherein the cover 22 is dimensioned with its insert part 23 in such a way that after the cover 22 is secured to the exhaust manifold 19, the guide track 12 is arranged at a suitable location in the exhaust manifold 19 which makes it possible to insert the free end 11 into the guide track 12, as is apparent in particular from the figurative illustration in FIGS. 9 to 11, to which reference is explicitly made in this respect.

FIG. 9 additionally illustrates an actuator 20 with an actuator rod 21 which is connected to the activation shaft 14, wherein the actuator 20 can be embodied as a customary activation device, such as for example a control actuator.

Figure 12:
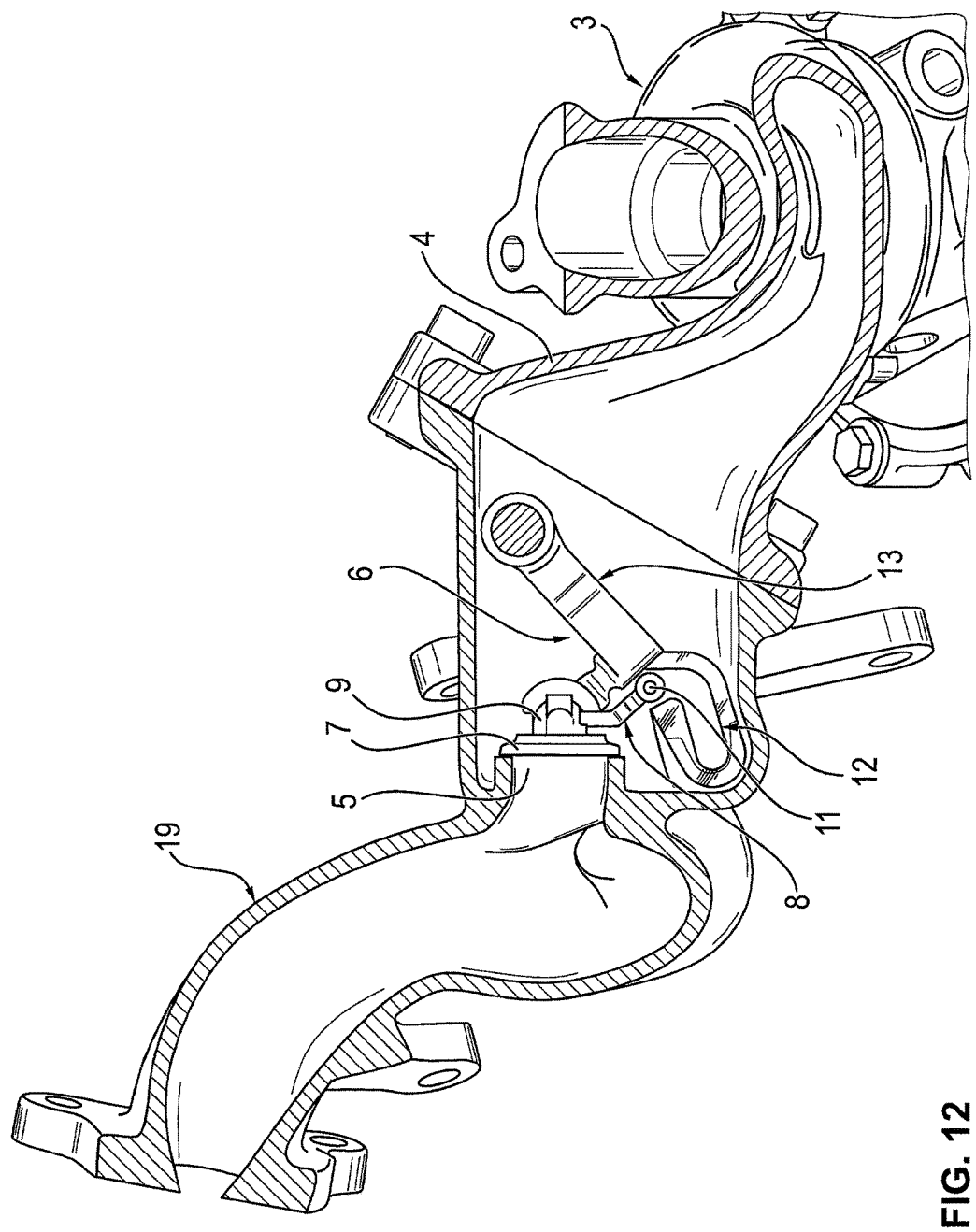
FIG. 12 shows a sectional illustration through a turbine casing of an exhaust gas turbocharger according to the invention, and an exhaust manifold which is connected to the turbine casing and has an integrated control flap arrangement.

FIG. 12 illustrates a further conceivable embodiment of the exhaust gas turbocharger according to the invention or of the control flap arrangement 6 according to the invention. Here, FIG. 12 clarifies that the entire control flap arrangement 6, with the wastegate opening 5, the flap plate 7 and the guide track 12 as well as the guide lever 8 and the pivot lever 13, are integrated into the exhaust manifold 19. The exhaust manifold 19 with the integrated control flap arrangement 6 is then connected to the turbine casing 4, in particular screwed thereto, as is apparent from the figurative drawing in FIG. 12. Otherwise, reference can be made to the explanations above regarding the design of the control flap arrangement 6 according to the embodiment in FIG. 12.

In order to supplement the disclosure of the invention, reference is explicitly made here to the figurative illustration thereof in FIGS. 1 to 11.

LIST OF REFERENCE SYMBOLS

1 Exhaust gas turbocharger
2 Compressor
3 Turbine
4 Turbine casing
5 Wastegate opening
6 Charge pressure control flap arrangement
7 Flap plate
8 Guide lever
8A, 8B, 8C Lever sections
9 First end
10 Rear side
11 Second free end
12 Curved track
12A, 12B, 12C Track sections
13 Pivot lever
13A, 13B First, second lever arm
14 Activation shaft
15 Sliding bushing
16 Ball joint
17 Fork receptacle
18 Insert/installation part
19 Exhaust manifold
20 Actuator
21 Actuating rod
22 Cover/installation part
23 Insert part
α, β Angle
E Plane
L Longitudinal axis
H Resulting lever arm

The invention claimed is:

1. An exhaust gas turbocharger (1) comprising
a compressor (2), and
a turbine (3),
   which has a turbine casing (4), and
   which has a charge pressure control flap arrangement (6) with a flap plate (7) which can be moved between a closed position on a wastegate opening (5) and an open position via an activation shaft (14),
wherein the flap plate (7) is provided with a guide lever (8) separate from the activation shaft (14), the guide lever (8) having a first end and a second end, wherein the guide lever (8) first end (9) is connected to a rear side (10) of the flap plate (7) and the guide lever (8) second end (11) is guided in a curved track (12).

2. The exhaust gas turbocharger as claimed in claim 1, wherein the flap plate (7) is connected to a bent pivot lever (13) which is operatively connected to the activation shaft (14) of an actuator of the control flap arrangement (6).

3. The exhaust gas turbocharger as claimed in claim 1 wherein the guide lever (8) has a lever section (8A) which extends linearly from the guide lever (8) second free end (11), at least approximately in parallel with a longitudinal axis (L) of the activation shaft (14).

4. The exhaust gas turbocharger as claimed in claim 1, wherein the guide lever (8) second end (11) is provided with a sliding bushing or a roller body (15).

5. The exhaust gas turbocharger as claimed in claim 1, wherein the guide lever (8) first end (9) is provided with a ball joint or a pin joint (16).

6. The exhaust gas turbocharger as claimed in claim 1, wherein the charge pressure control flap arrangement (6) is embodied as a separate insert (18).

7. An exhaust gas turbocharger (1) comprising
a compressor (2), and
a turbine (3),
   which has a turbine casing (4), and
   which has a charge pressure control flap arrangement (6) with a flap plate (7) which can be moved between a closed position on a wastegate opening (5) and an open position,
wherein the flap plate (7) is provided with a guide lever (8) having a first end and a second end, wherein the guide lever (8) first end (9) is connected to a rear side (10) of the flap plate (7) and the guide lever (8) second end (11) is guided in a curved track (12), wherein the curved track (12) is integrated into the turbine casing (4).

8. An exhaust gas turbocharger (1) comprising
a compressor (2), and
a turbine (3),
   which has a turbine casing (4), and
   which has a charge pressure control flap arrangement (6) with a flap plate (7) which can be moved between a closed position on a wastegate opening (5) and an open position,
wherein the flap plate (7) is provided with a guide lever (8) having a first end and a second end, wherein the guide lever (8) first end (9) is connected to a rear side (10) of the flap plate (7) and the guide lever (8) second end (11) is guided in a curved track (12), wherein the curved track (12) is integrated into an exhaust manifold (19).

\* \* \* \* \*